United States Patent [19]

Martin

[11] Patent Number: 5,173,863
[45] Date of Patent: Dec. 22, 1992

[54] PROGRAMMABLE SURFACE GRINDER HAVING A TEACH MODE WITH INDEPENDENT TABLE SPEED ADJUSTMENT

[75] Inventor: Michael W. Martin, Ada, Mich.

[73] Assignee: Pace Technologies, Comstock Park, Mich.

[21] Appl. No.: 514,166

[22] Filed: Apr. 25, 1990

[51] Int. Cl.$^5$ ............................................. B24B 49/00
[52] U.S. Cl. ................................ 364/474.06; 364/193
[58] Field of Search ...................... 364/474.06, 474.03, 364/191, 192, 193; 51/165.71, 165.74, 165.75

[56] References Cited

U.S. PATENT DOCUMENTS

| | | |
|---|---|---|
| 2,927,403 | 3/1960 | Holland et al. |
| 2,933,858 | 4/1960 | Glenn et al. |
| 2,986,852 | 6/1961 | Wilson |
| 3,073,072 | 1/1963 | Selby |
| 3,157,969 | 11/1964 | Eant |
| 3,579,913 | 5/1971 | Suzuki |
| 3,670,457 | 6/1972 | Berkholes |
| 3,829,750 | 8/1974 | Centner et al. |
| 4,485,594 | 12/1984 | Guertin et al. |
| 4,498,259 | 2/1985 | Yamamoto et al. ............. 364/474.06 |
| 4,502,125 | 2/1985 | Yoneda et al. ................. 364/474.06 |
| 4,523,409 | 6/1985 | De Fazio |
| 4,524,547 | 6/1985 | Heaston et al. |
| 4,570,385 | 2/1986 | Richter et al. ................. 364/474.06 |
| 4,603,392 | 7/1986 | Chikamoto et al. |
| 4,713,914 | 12/1987 | Oshima |
| 4,730,419 | 3/1988 | Nagata et al. |
| 4,810,945 | 3/1989 | Yoneda et al. |
| 4,817,339 | 4/1989 | Weidmo et al. |

Primary Examiner—Jerry Smith
Assistant Examiner—Patrick D. Muir
Attorney, Agent, or Firm—Price, Heneveld, Cooper, DeWitt & Litton

[57] ABSTRACT

A surface grinder includes a bed or base, a table supported on the bed for reciprocating movement and a grinding wheel supported on a vertical column. An actuator connected to the table reciprocates the table relative to the grinding wheel. A programmable control system is operatively connected to the actuator to move the table from a home position to a feed or ramp-in position through a cutting motion, through a wipe cycle or spark out motion and to return the table to the home position. The part to be ground is held on the table by a magnetic chuck. The control system includes a manually operable teach input device which permits the operator to program the control system to set the table motion while manually moving the table through a grinding cycle. The control system provides accurate bidirectional control over the motion of the table. The operator may independently vary the speed of the table between its movement between various positions during programming.

5 Claims, 9 Drawing Sheets

UPPER PORTION

LOWER PORTION

PROGRAMMABLE SURFACE GRINDER HAVING A TEACH MODE WITH INDEPENDENT TABLE SPEED ADJUSTMENT

BACKGROUND OF THE INVENTION

The present invention relates to surface grinders and more particularly to a surface grinder incorporating an automatic control system.

Various types of surface grinders are commercially available. A typical grinder includes a bed or base upon which a table is mounted for reciprocating motion. A vertical column is secured to the base and a spindle is adjustably mounted on the column for vertical movement. A grinding wheel is fixed to the spindle. A work piece or part is secured to the table by means of a magnetic chuck or other fixture. The table may be moved under the wheel manually with a rack and pinion drive and through an hydraulic actuator. To remove material from the work piece or part, the vertical position of the spindle is set and the table is moved to bring the work piece into contact with the grinding wheel. In order to work on parts which are wider than the width of the wheel, most surface grinders also incorporate a cross-feed mechanism which moves the column transversely with respect to the bed. Examples of prior surface grinders may be found in U.S. Pat. No. 2,986,852 entitled GRINDING MACHINES which issued on Jun. 6, 1961 to Wilson; U.S. Pat. No. 3,670,457 entitled ADJUSTABLE TRAVERSE CONTROL FOR SURFACE GRINDER which issued on Jun. 20, 1972 to Berkholcs; U.S. Pat. No. 3,829,750 entitled SELF-ADAPTIVE PROCESS CONTROL which issued on Aug. 13, 1974 to Centner et al; and U.S. Pat. No. 4,485,594 entitled SURFACE GRINDING MACHINE which issued on Dec. 4, 1984 to Guertin et al.

Prior surface grinders have included manual and automatic control systems. The automatic control systems typically include a computer numerical control or CNC device. A control system is disclosed, for example, in U.S. Pat. No. 4,810,945 entitled NUMERICAL CONTROL FEED DEVICE FOR MACHINE TOOL which issued on Mar. 7, 1989 to Yoneda et al. Prior computerized control systems have been relatively expensive and complicated. Such are generally used therefore with machines adapted to grind complex configurations with tight tolerances.

In certain industries such as the carbide insert manufacturing industry, difficulties are encountered with maintaining production rates and quality when the part or work piece is ground using manual control of the surface grinder. The nature of the carbide insert parts being fabricated and the nature of the industry is such, however, that complex and expensive numerically controlled grinders are not cost justified. The shapes and profiles formed are not sufficiently complex to dictate or mandate the use of such machines. Also, such machines require extensive operator training for proper operation. Typically, carbide inserts are ground on manually controlled machines and the benefits of improved quality and increased productivity through automation are not obtained. A need exists, therefore, for a surface grinder having a control system capable of achieving desired quality with improved production rates but which is relatively inexpensive to manufacture and which does not require extensive operator training for proper use.

SUMMARY OF THE INVENTION

In accordance with the present invention, the aforementioned needs are met. Essentially, a surface grinder is provided which includes a bed, a table supported on the bed for reciprocating movement, a column, a grinding wheel and spindle supported on the column for vertical movement and an actuator for moving the table relative to the grinding wheel. A programmable control means is operably connected to the actuator for controlling movement of the table during the grinding operation. The control means includes a manually actuable switch or teach input device which permits an inexperienced operator to program the system for proper automatic operation. The table motion is programmed by placing a finished part on the table and manually moving the table through the grinding cycle and inputting the appropriate table positions through the manually actuated switch. Once the table motions are programmed into the control system, automatic and repeatable operation is achieved.

DETAILED DESCRIPTION OF THE PREFERRED EMBODIMENT

Figure 1:
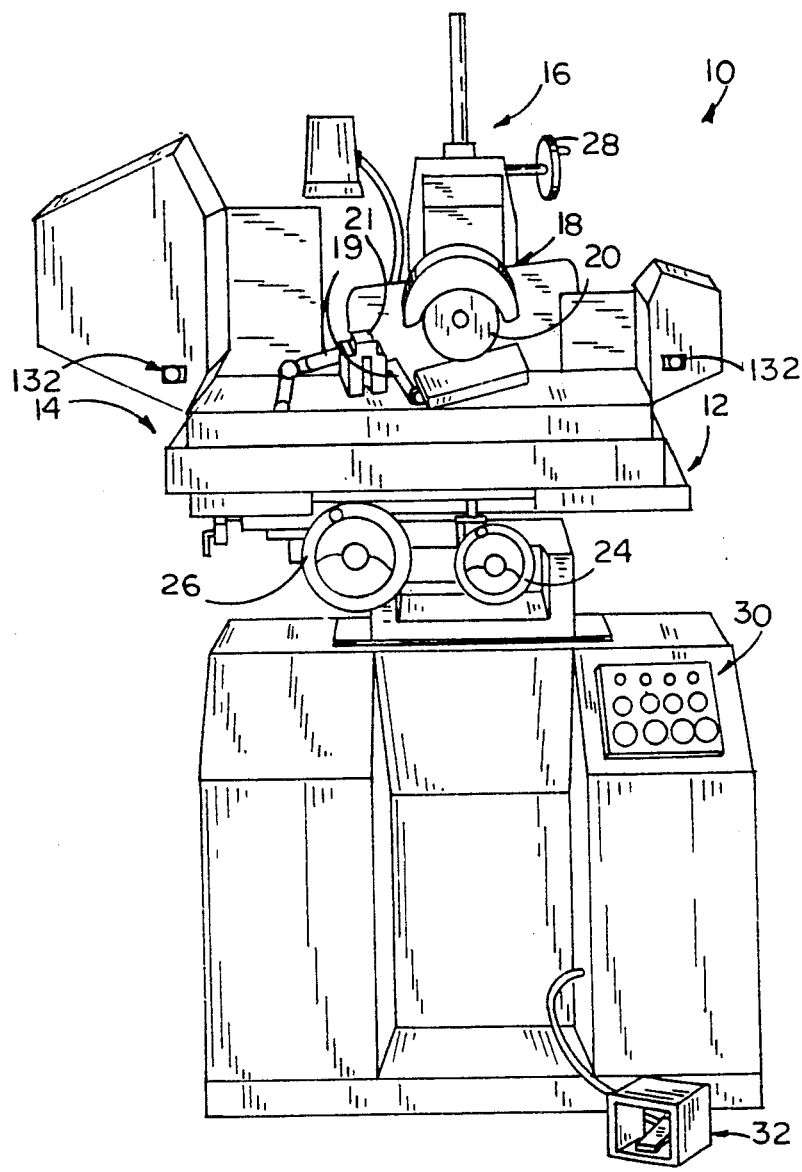
FIG. 1 is a front, elevational view of a surface grinder in accordance with the present invention.

A surface grinder in accordance with the present invention is illustrated in FIG. 1 and generally designated by the numeral 10. Grinder 10 includes a bed or base structure 12 upon which a table 14 is mounted. Table 14 is mounted in suitable ways for reciprocating movement lengthwise of bed 12. Grinder 10 also includes a vertical column 16 which supports a spindle subassembly 18. Spindle subassembly 18 receives a grinding wheel 20. In a conventional fashion, spindle subassembly 18 and grinding wheel 20 may be moved transversely of bed 12 and hence table 14 by a cross-feed mechanism. In addition, grinder 10 includes a recirculating coolant system having hoses 19 and a fixture on a magnetic chuck 21. The basic grinder 10 is conventional. Vertical movement of spindle subassembly 18 and reciprocating movement of table 14 may be controlled through suitable hand wheels 24, 26 and 28 in a known manner.

Figure 3:
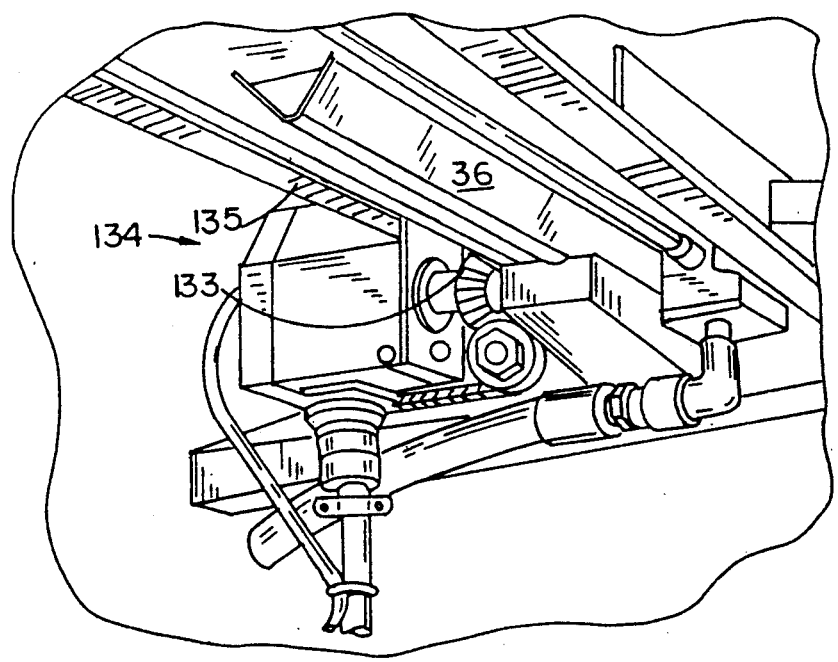
FIG. 3 is a fragmentary, perspective view of a portion of the grinder of FIG. 1 showing a rotary encoder incorporated therein.
Figure 4:
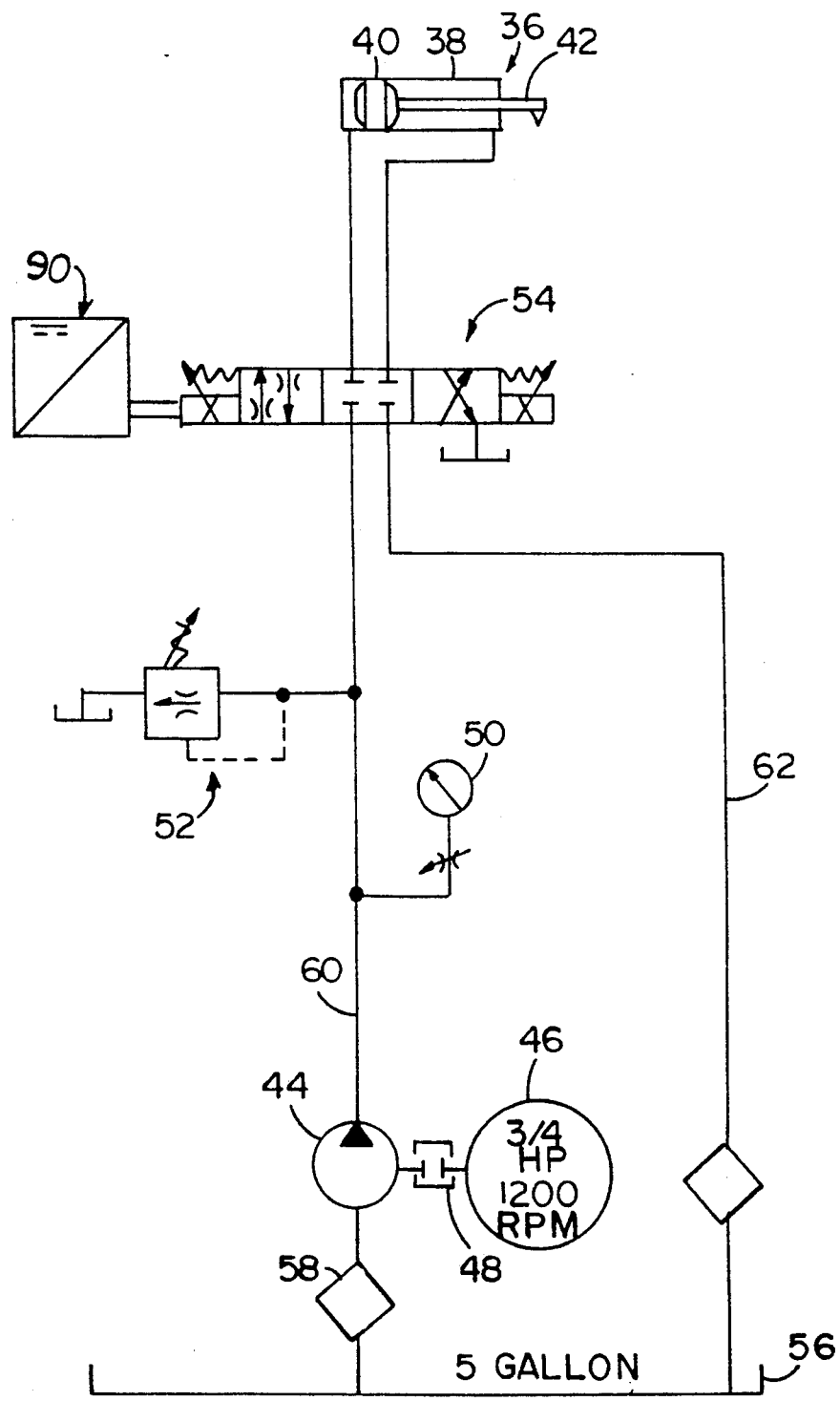
FIG. 4 is a schematic of the hydraulic system incorporated in the present invention.

In accordance with the present invention, grinder 10 includes a control panel 30 and an input device in the form of a foot pedal or switch 32. Table 14 is reciprocated on bed 12 by an hydraulic piston/cylinder actuator 36 (FIGS. 3 and 4). Actuator 36 includes a cylinder 38, a piston 40 and a rod 42 which is connected to table 14.

As schematically shown in FIG. 4, the hydraulic system for controlling movement of the table includes an hydraulic pump 44 driven by a suitable motor 46 through a pump coupling 48. The control system further includes a gauge 50, a relief valve 52 and an hydraulic control valve 54. Hydraulic fluid within a reservoir 56 enters an inlet port of pump 44 through and intake line and strainer 58. An outlet of pump 44 is connected to control valve 54 through hydraulic line 60. Hydraulic fluid returns to reservoir 56 through a return line 62. In accordance with the present invention, control valve 54 is an electromechanical proportional spool valve including proportional solenoid actuators. Movement of the spool valve in one direction directs hydraulic fluid at a given rate and pressure to one side of the piston while opening the opposite side of the piston to a drain port connected to return 62. The rate of movement of piston 40 is directly proportional to the current supplied to one of the solenoids of control valve 54. The proportional control valve provides accurate control over the motion of the table and hence the grinding operation. Valves 54 is positioned and controlled by a control means or system 90 which is schematically illustrated in FIGS. 5a-e.

System 90 includes a circuit portion 102 for supplying power to motor 46 and a spindle motor 104. Circuit portion 102 may include an emergency stop switch 106 which cuts all power to the control system. The control system further includes spindle power switch 108, a main power selector switch 110 and a coolant selector switch 112. The three position coolant selector switch 112 will turn off all coolant pump functions controlled through relay CR1 when in the left position. When in the middle position, the pump will run at all times. When in the far right or auto position, the coolant pump is turned on based upon the table position. The system includes a jog switch 114, a mode switch 116, a return to load switch 118, a three-position wipe switch 120, a teach switch 122 and a surface grind on/off switch 124. A programmable industrial microprocessor 128 is connected to the input switches. In a presently existing embodiment, microprocessor 128 is a Gould Model 0085-103 programmable industrial microprocessor.

Figure 5A:
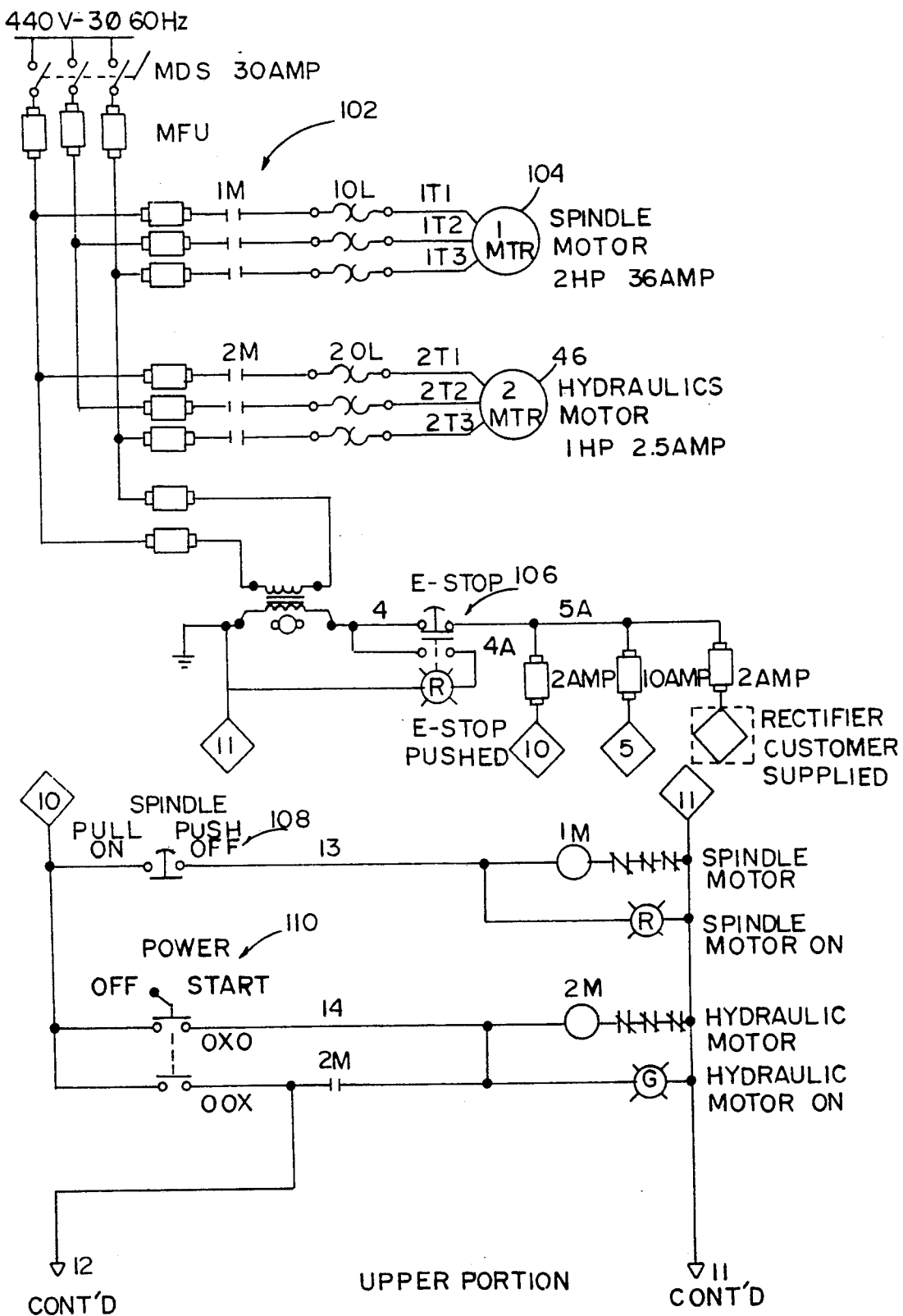
FIGS. 5a–e are a ladder diagram or schematic of the control system incorporated in the present invention.
Figure 5A:
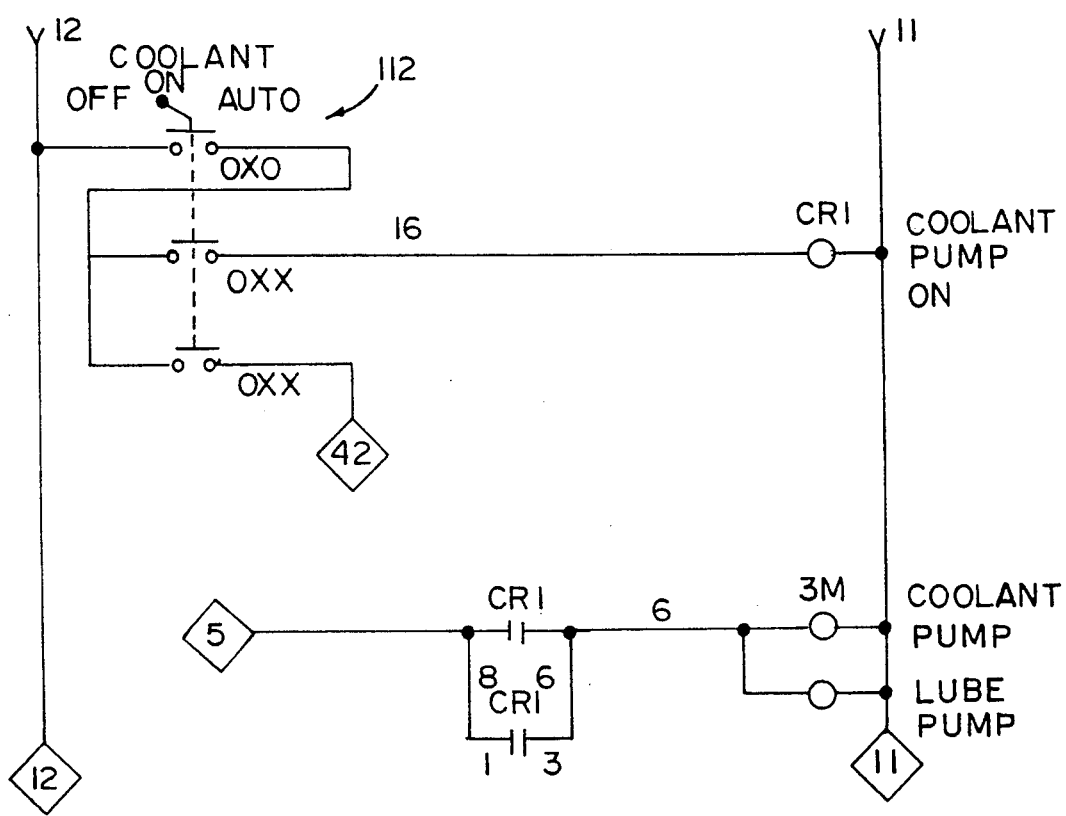
Figure 5B:
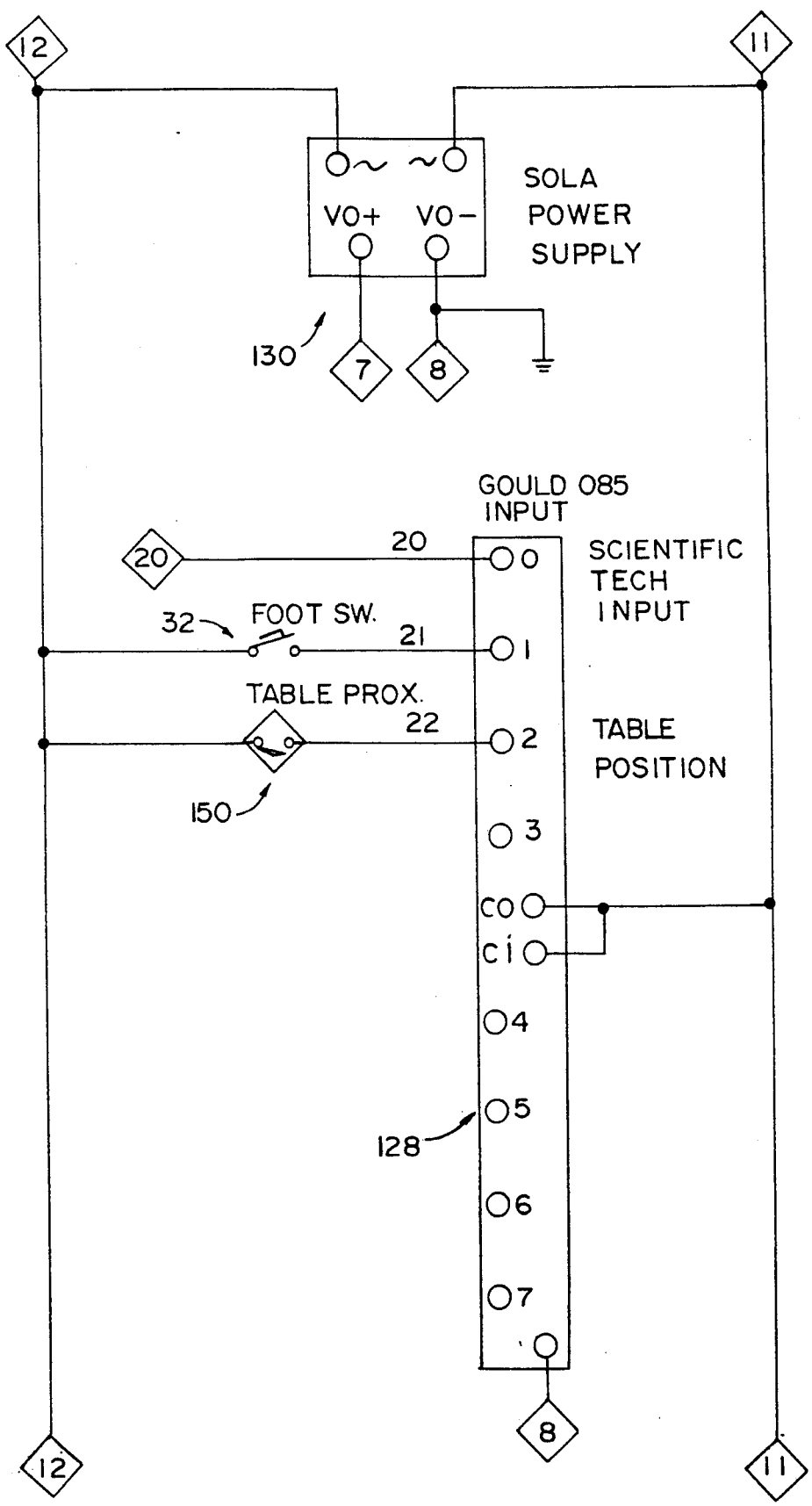
Figure 5C:
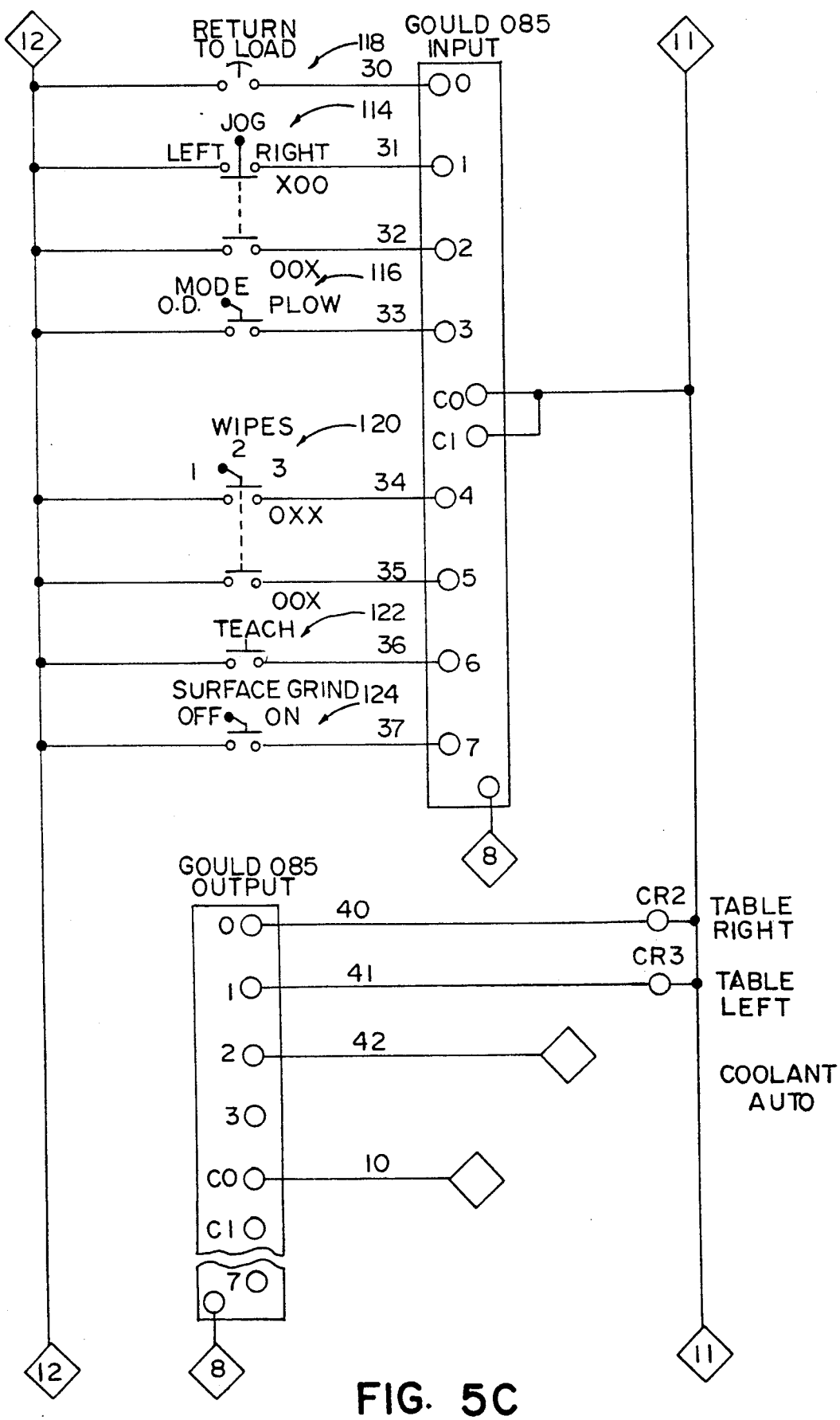
Figure 5D:
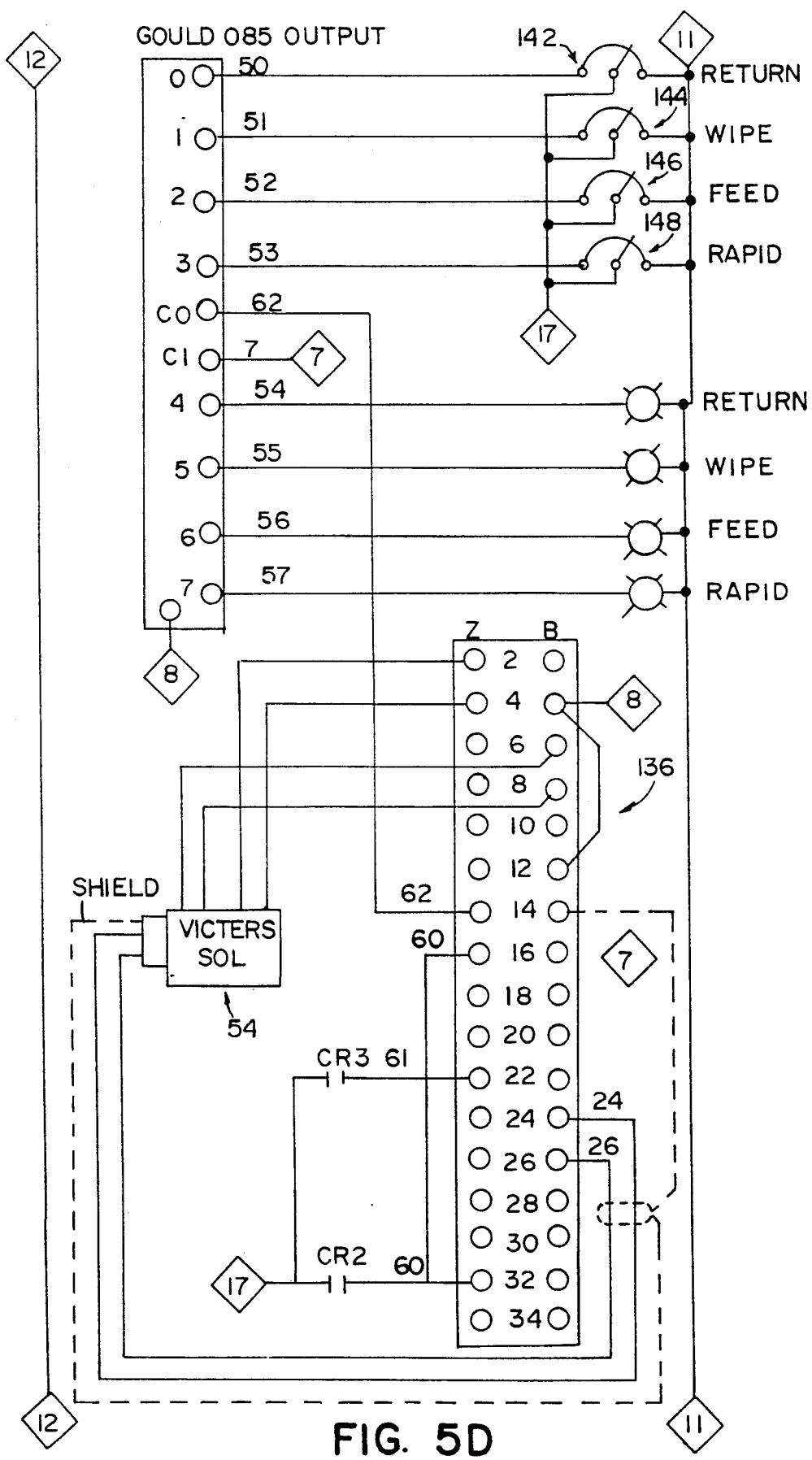
Figure 5E:
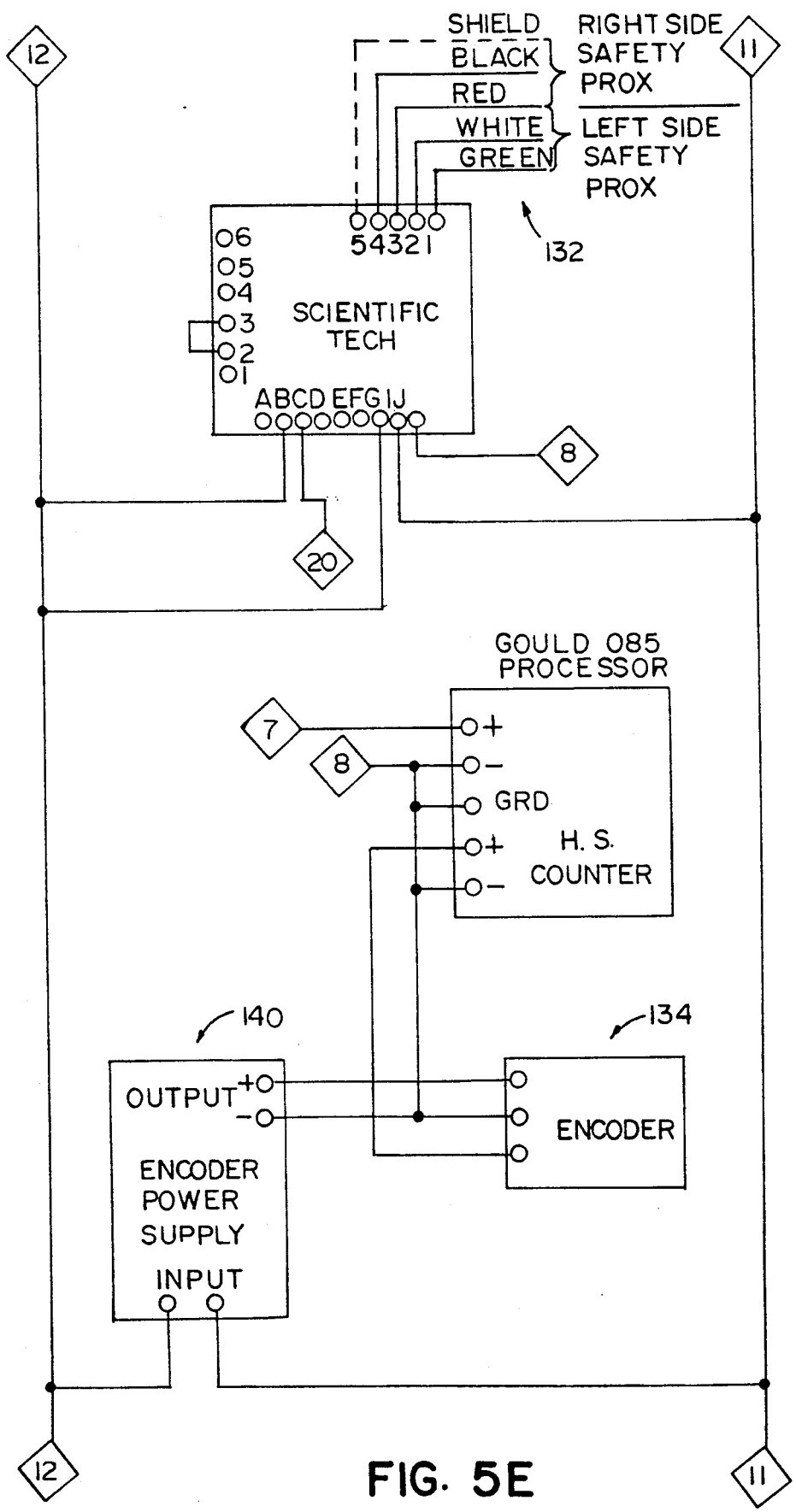

The system further includes a power supply 130, safety proximity means or photocell devices 132, a rotary encoder 134 (FIG. 5e and FIG. 3) and an amplifier card 136. Proximity photocell devices 132 are positioned on the guards for the grinder. As shown in FIGS. 5b and 5e, the output from the devices is an input to the microprocessor. Should a guard be removed or broken, the photocells cause the microprocessor to return the table automatically to its home position. The devices are conventional and may be of a type manufactured by Scientific Technology. Card 136 is connected to the solenoids of proportional hydraulic control valve 54. In a presently existing embodiment, the proportional hydraulic control valve is a Vickers Model KDG1-3A-25-V-50 and the amplifier card is a Vickers Model KDG1-3A-AR-6148.

The control system includes an encoder power supply 140, a return speed potentiometer 142, a wipe speed potentiometer 144, a feed speed potentiometer 146 and a rapid return speed potentiometer 148. Microprocessor 128 is programmed to control reciprocating motion of the table during the grinding operation. The output from the photocell proximity devices 132, table home proximity switch 156 and encoder 134 are inputs to processor 128. The microprocessor controls operation of hydraulic actuator 36 through amplifier card 136 and control valve 154. The program for the microprocessor is set forth in attached Appendix A.

For initial set up, the operator selects the grinding wheel and fixture for the specific cut to be made on the insert part or workpiece, the same as would be done for manual grinding operations. The operator mounts the wheel on the spindle and places a part to be manually ground in a fixture. The fixture is mounted on the magnetic chuck. The chuck is turned on in a conventional fashion. The mode is then selected. When in the OD mode, the table moves from left to right when viewed in FIG. 1 with the home position being at the far left. When in the plow mode, the table moves into the grinding wheel from right to left. Next, the operator turns the power switch all the way to the right to the start position. The switch will be released and return to the center or run position. All control circuits with exception of the spindle motor control are now turned on. A manual disconnect (not shown) on the left side of the table is then disconnected. This mechanism connects the table to the hydraulic cylinder in a conventional fashion. The table is moved manually with the hand wheel to the far left position. At this point, switch 108 is pulled energizing the 1M motor starter. Coolant hoses lines 19 are then positioned so that coolant floods the part or work-piece being ground. The coolant pump can be activated at this time by manually turning the coolant selector switch 112 to the "on" position. Next, the operator manually brings the table to meet the grinding wheel. The operator then adjusts the wheel height according to the specifications for the particular part being formed. The vertical hand wheel mounted to the column is used for this adjustment. The finished part is passed through the grinding wheel and checked for proper specifications.

After manual set up, the system is ready for programming for full automatic operation. The finished part made manually, as described above, is placed back in the fixture. The teach button or switch 122 is then pushed. This energizes an input to the microprocessor 128 which in accordance with the program starts a file for the new positions which will be entered for the table. The operator next manually moves the table to the right to the feed or ramp-in position 161 (FIG. 6) with the table stopping just before the wheel would contact the part. The operator then pushes the foot pedal switch 32. This inputs the ramp-in position of the table. Table movement from the home position has been recorded by the microprocessor through the rotary encoder 134. As shown in FIG. 3, encoder 134 includes an input pinion 133 which engages a rack 135 supported on the surface grinder. The encoder is mounted on the table so that it generates output pulses directly proportional to movement of the table from the home position and which are recorded by a high speed counter (FIG. 5e).

Figure 6:
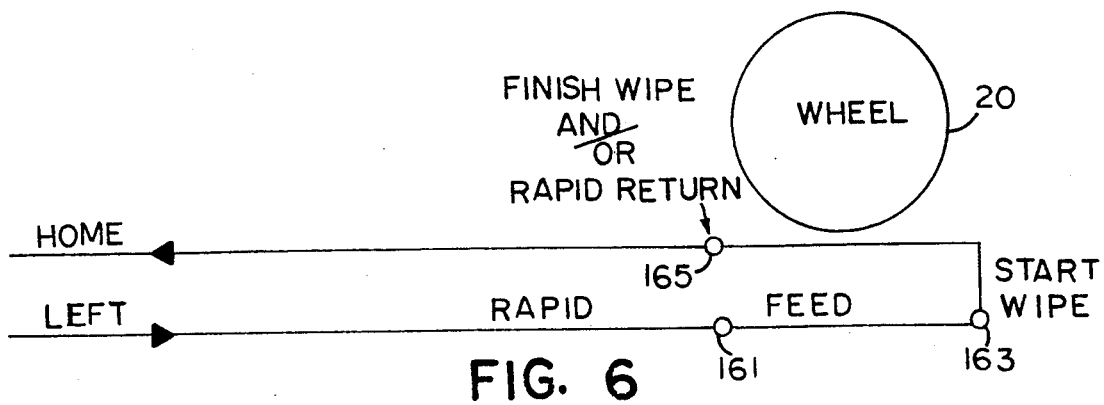
FIG. 6 is a schematic illustrating the mode of operation of the surface grinder in accordance with the present invention.
Figure 2:
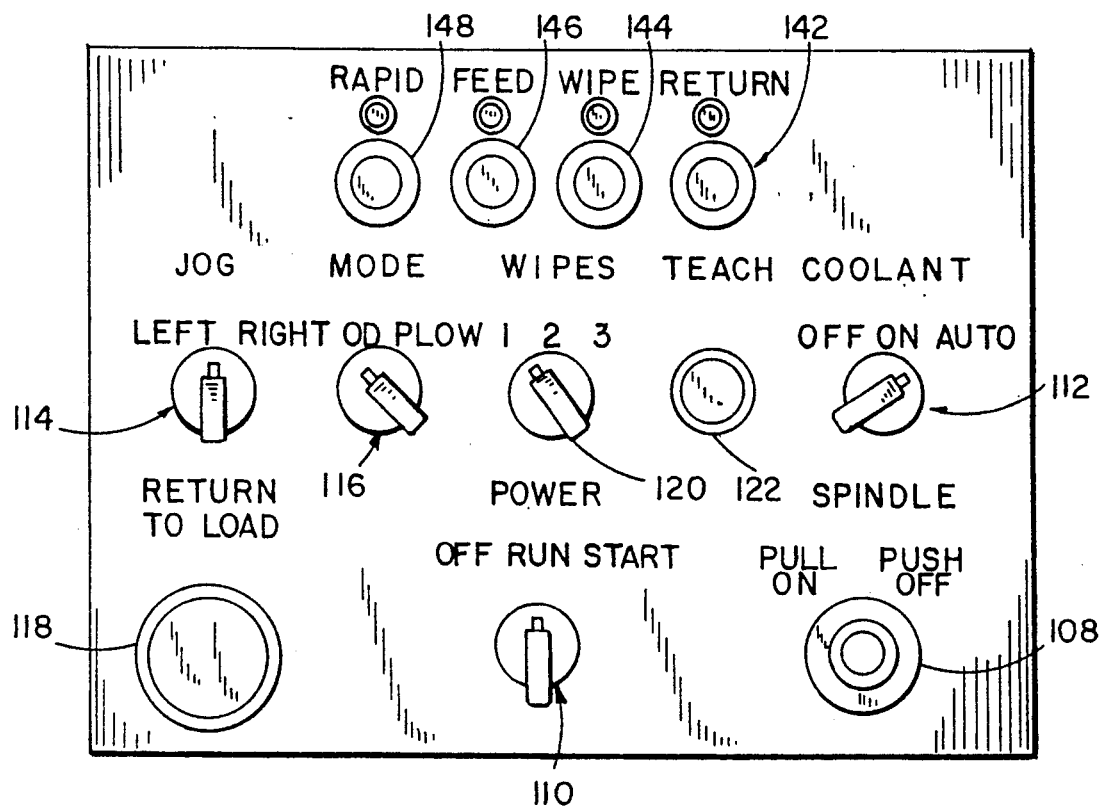
FIG. 2 is a plan view of a control panel incorporated in the grinder of FIG. 1.

Control now changes from the rapid mode to the start of the feed mode. The table is moved to the right passing the work piece or part past the wheel until the part just clears the wheel to position 163. This marks the end of the feed stroke and start of the wipe or return stroke. At this point, the foot switch 32 is again pressed. The position at the end of the feed stroke and the beginning of the wipe stroke is now entered. The table is then moved back to the left until the part again passes by the wheel and just clears the wheel to to the finish wipe or rapid return position 165. The foot pedal is then pressed. This logs into memory the finish wipe and/or rapid return position. The stroke lengths for the cylinder for the given part necessary to accomplish the grinding operation have now been entered into the program. Next, the operator will connect the hydraulic cylinder. If the cylinder is not in the proper position, the jog switch 114 is used to align the cylinder with the hydraulic disconnect. Moving selector switch 114 to the left jogs or moves the cylinder to the left. Positioning of the switch to the right jogs or moves the cylinder to the right. The motion of the table during the grinding operation is schematically illustrated in FIG. 6. Next, the operator will turn all potentiometers 142, 144, 146 and 148 to a minimum speed position. The potentiometers permit variable control of the speed or rate of motion of the table during the grinding cycle.

The machine is now ready for automatic grinding operations. The operator turns the coolant pump selector switch to the automatic mode. As illustrated in the ladder diagram, when the switch is in the automatic position, the coolant pump is on only when the table is between the feed position 161 and the start wipe position 163 and the finish wipe and or rapid return position 165. The operator then selects the desired number of wipes or spark outs employing switch 120. In a presently existing embodiment, 1, 2 or 3 wipes are available. The number selected is entered into the memory of the microprocessor. Next, a fresh part to be ground is loaded in the fixture. The operator then pushes the foot pedal which starts operation of the automatic cycle. The table will rapid traverse from the home position to the feed position 161, as illustrated in FIG. 6. The rate of traversal is controlled by potentiometer 148. When the table reaches the feed position, the rate of movement of the table is now controlled by feed potentiometer 146 and the part is fed past the grinding wheel. Once the part clears the wheel and reaches the start wipe position 163, the wipe setting speed set by potentiometer 144 is enabled. The table will traverse back and forth between the start wipe position and the finish wipe position 165 until the wipe setting on the selector switch is reached. After 1, 2 or 3 wipe or spark outs occur, the table will then return to the home position at the speed set by the return potentiometer 142. The operator may manually vary, that is increase or decrease, the potentiometers 142-148 to obtain a desired rate. A fresh part may then be loaded on the fixture and the foot pedal actuated to repeat the grinding cycle.

The operator may return the table to the home position by pushing the return button 118. In addition, the operator may push the emergency stop button 106 cutting electrical power and stopping the cycle at the then position of the table. If an object passes through a light beam of one of the photoelectric devices 132, the table will also return to the home position.

If mode switch 116 is set in the plow mode position, the table is now positioned to the far right and table movement is from right to left. The above set-up steps are then repeated. The only difference in operation between the OD and plow modes is that the table is now disconnected from the cylinder and moved manually to the far right and the far right position becomes the home position. After the initial manual grind is performed as discussed above, the operator will jog the cylinder to the right using selector switch 114 and connect the cylinder to the hydraulic disconnect.

As should now be readily apparent to one of ordinary skill in the art, the present invention provides a simple and reliable control system for a surface grinder which provides repeatability, increased quality and improved production rates over manual operation. The use of the simple teach mode with table positions inputted through the manual foot switch using a previously formed part simplifies set-up and programming. No special operator training is necessary. The system is of substantially reduced complexity from automatic systems heretofore provided. Many of the benefits of prior complicated CNC machines are now provided to additional manufacturing industries and specifically the carbide insert manufacturing industry.

The control system in accordance with the present invention provides manual programming from an existing part to obtain the desired specifications. The present invention controls feed and speed positioning, provides variable wipe capabilities and permits the achievement of improved production standards and increased quality. The control system in accordance with the present invention may also be retrofitted to existing surface grinders or installed in such grinders. The present invention allows increased control of man-hour overhead, reduces diamond wheel cost, improves part surface finish and provides consistency and repeatability during production runs. Those of ordinary skill in the art may envision various modifications which would not depart from the inventive concepts disclosed herein. For example, the teach input device 32 may be palm actuated switch. It is expressly intended, therefore, that the above should be considered as only the description of the preferred embodiment. The true spirit and scope of the present invention may be determined by reference to the appended claims.

The embodiments of the invention in which an exclusive property or privilege is claimed are defined as follows:

1. A surface grinder of the type comprising:
a bed, a table supported on the bed for reciprocating movement, a column, a grinding wheel supported on the column for vertical movement, and a piston/cylinder actuator connected to the table for reciprocating said table from a home position relative to said grinding wheel, said grinder further comprising:
hydraulic means operatively connected to said piston/cylinder actuator for operating said actuator to move said table from the home position to a feed position to a start wipe position to a finish wipe position and back to the home position; and
programmable control means operatively connected to said hydraulic means for controlling operation of said hydraulic means and said actuator to automatically move said table to the feed position, through a cutting motion, through at least one wipe motion and a return motion to said home position at a controllable rate, said control means including a jog switch, a mode switch and a manually operable teach input means having a manually operable teach switch and an input switch to program table position for a given part to be ground by manually positioning the table and entering feed position, stop position and a finish wipe and rapid return position through actuation of said input switch, said programmable control mean further including variable speed control means for independently varying the speed of table motion from the home position to the feed position, from the feed position to the start wipe position, from the start wipe position to the finish wipe position and from the finish wipe position to the home position and wipe cycle setting means for setting the number of wipe cycles.

2. A surface grinder as defined by claim 1 wherein said hydraulic means comprises:
   a pump;
   a source of hydraulic fluid connected to the pump; and
   an electrically controlled proportional hydraulic control valve having at least one output port connected to said actuator and a return port.

3. A surface grinder as defined by claim 2 wherein said control means further includes an encoder having an output proportional to table position.

4. A surface grinder as defined by claim 3 wherein said grinder further includes:
   recirculating coolant means operatively connected to said control means for directing coolant to the grinding wheel and part during grinding.

5. A surface grinder as defined by claim 1 wherein said control means further includes an encoder having an output proportional to table position.

* * * * *